Figure 1:
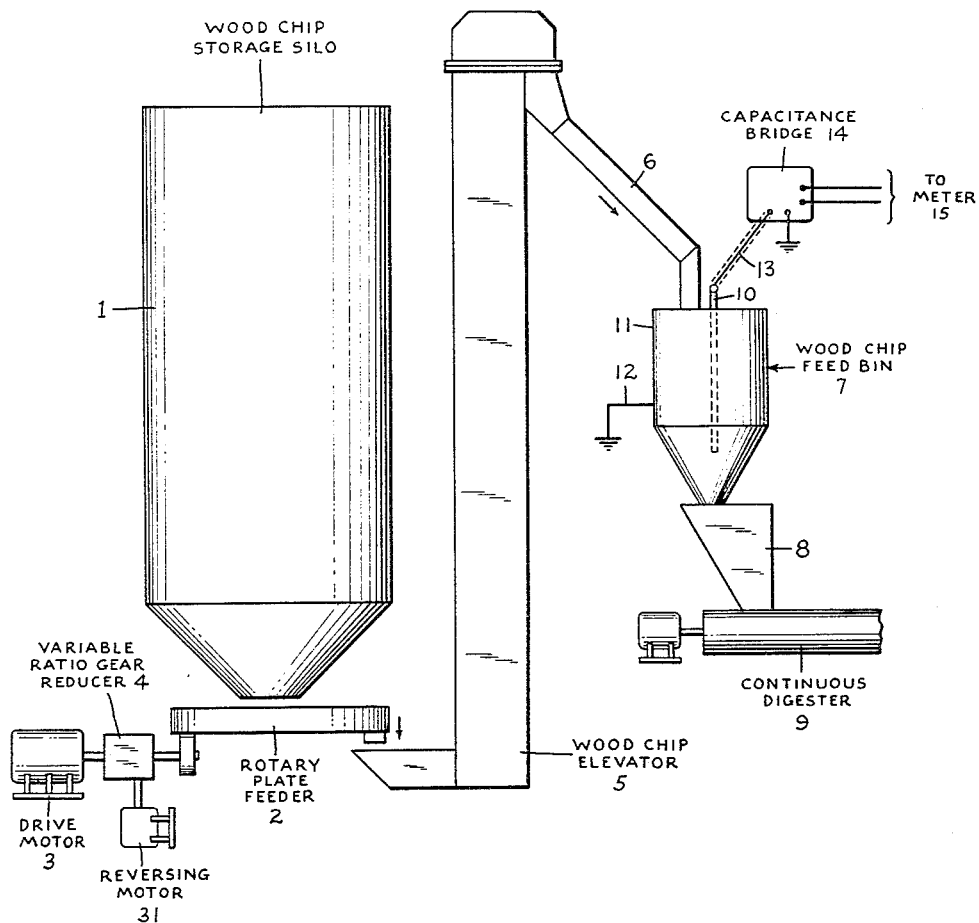

May 31, 1960 M. C. BOYD 2,938,639
WOOD CHIP LEVEL CONTROL
Filed Nov. 27, 1957 2 Sheets-Sheet 1

INVENTOR
MILLARD C. BOYD
BY
Charles W. Brown
ATTORNEY

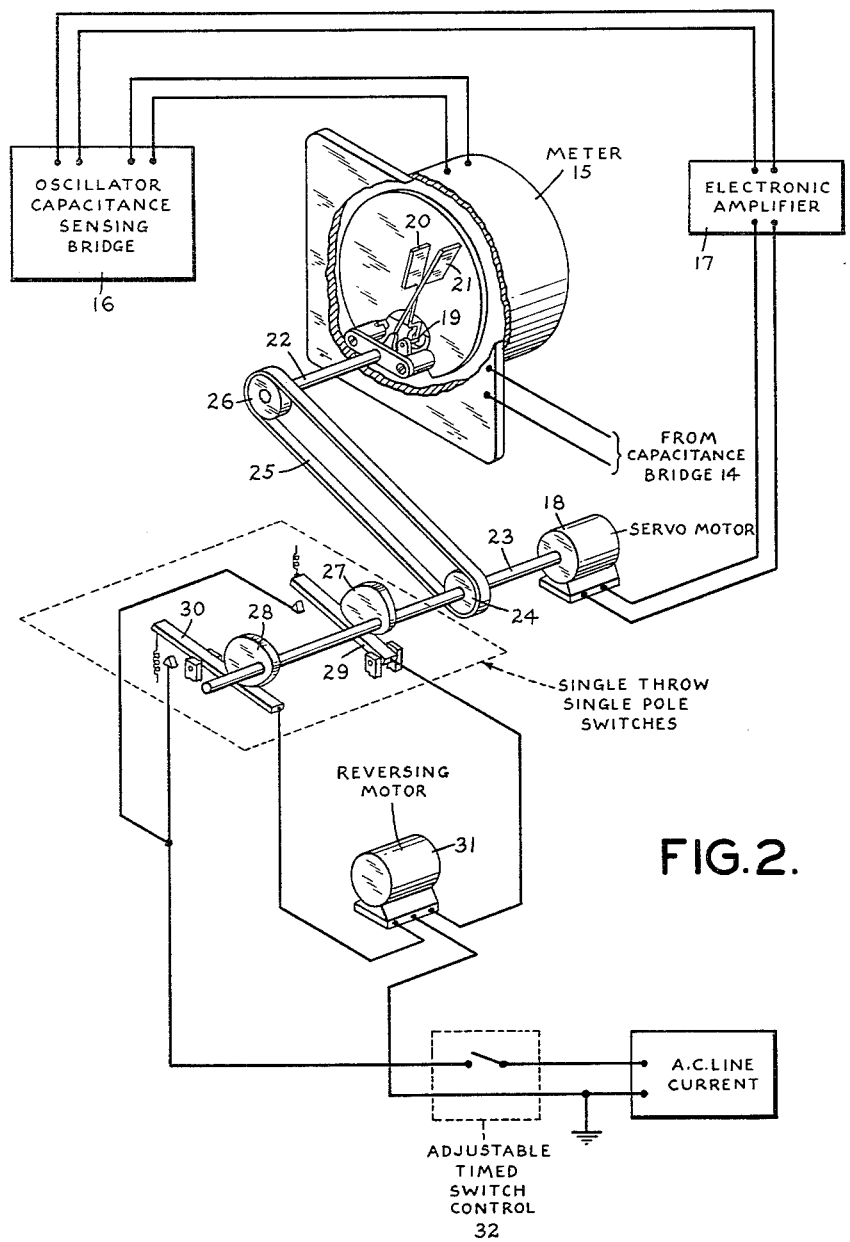

United States Patent Office 2,938,639
Patented May 31, 1960

---

2,938,639

WOOD CHIP LEVEL CONTROL

Millard C. Boyd, Mountain Lakes, N.J., assignor to Allied Chemical Corporation, a corporation of New York Filed Nov. 27, 1957, Ser. No. 699,298

7 Claims. (Cl. 214—17)

This invention relates to an apparatus for regulating the transfer of wood chips from a storage container and supplying them to a feed container from which the wood chips are withdrawn and pass at a controlled rate to a vessel in which they are treated. More particularly, it relates to a capacitor the capacitance of which changes in response to changes in the chip level in the feed container, and means responsive to those changes in capacitance, for varying the rate of transfer of wood chips from the storage container to the feed container and maintaining the chip level in the feed container within suitable limits as changes occur in the rate at which chips are withdrawn therefrom.

In a more specific form the apparatus of this invention comprises a wood chip storage silo from the bottom of which wood chips are drawn and introduced into a wood chip feed bin. A rotating plate feeder provided with an electrically controlled, variable rate driving means, serves to regulate the rate of withdrawal of the wood chips from the silo and their introduction into the feed bin. From the bottom of the feed bin the wood chips pass at a controlled rate into and through a wood chip digester.

A first electrode extends within the body of wood chips in the feed bin from a point substantially below to a point substantially above a desired level of wood chips in the bin. A second electrode is spaced from the first electrode in a position such that wood chips within the feed bin and in the space between the two electrodes forms with the two electrodes a wood bin capacitor in which the wood chips together with the air in the space between the electrodes are the dielectric.

A radio frequency capacitance measuring bridge includes the wood chip bin capacitor in one arm of the bridge. This bridge is responsive to variations in capacitance of this capacitor and its output is a direct current, the amperage of which varies with variations in the space between the wood bin electrodes which is occupied by the wood chips. The bridge is, therefore, responsive to variations in the level of the wood chips in the bin.

The output of the capacitance measuring bridge is metered through a moving coil current measuring and current and coil torque amplifier. This unit comprises a moving coil meter, a high frequency capacitance sensing bridge, a current amplifier and a servo-motor. A meter vane is fixed to the shaft on which the meter coil turns, and a follower vane is mechanically connected with the servo-motor. These two vanes, with air as the dielectric, constitute a variable capacitor forming one leg of the capacitance sensing bridge. As this bridge is unbalanced by changes in the current through the meter, it is re-balanced by the servo-motor restoring the original spacing of the vanes.

Two cams carried by the shaft of the servo-motor operate, respectively, two switches in the line current leads to a reversing motor which drives a variable speed reduction gear in response to the movements of the servo-motor shaft to increase or decrease the rate at which the rotating plate feeder is driven, thus compensating for changes in the level of wood chips in the chip bin, and maintaining that level between desired maximum and minimum limits.

I believe myself to be the first to discover that a capacitor composed of two electrodes suitably spaced from each other to permit the level of wood chips in the space between the electrodes to rise and fall as the general level of the wood chips in a bin or container thus varies, is sufficiently sensitive and the changes in capacity with tolerable changes in the wood chip level are of sufficient magnitude, greater than the expected magnitude of changes induced by variations in size, moisture content and nature of the wood chips themselves, that such a capacitor could be used to actuate means for increasing or decreasing the rate of feed of wood chips to the bin to maintain the required substantial uniformity in the wood chip level.

Capacitor level controls for containers for liquids, such as aqueous solutions or petroleum products, or pulverized coal, have heretofore been disclosed. In many cases these are cut-on and cut-off controls for initiating supply of the material to the container when its level falls to a minimum, and stoppage of feed of the material to the container when its level rises to a maximum. Furthermore, capacitance level controls heretofore have been utilized when the materials in the containers had reasonably uniform or large dielectric constants. I have found the dielectric constant of a body of wood chips with the interstices filled with air varies over a wide range, ranging from 6 to 13 with normal variations in type, size and moisture content of the wood chips. This wide variation in the relatively low dielectric contant for wood chips as compared with relatively uniform constants for liquids and small-sized or pulverized solids, would appear to prohibit the use of a capacitor as a means for controlling wood chip levels to the degree required for practical operations.

Further, I have discovered the particular combination of a probe electrode centrally disposed within a container for wood chips, a metal wall of the container itself as the second electrode and the wood chips in the container as a dielectric, forms a condenser which is especially suitable for very close control of the chip level in the container. The feed of wood chips to bins or other containers from which the material is to be withdrawn as it is fed, presents a difficult problem of maintaining a relatively uniform level in the container. With the feed primarily centralized in the container and the material withdrawn slower than it is fed, the top surface cones up towards the central feed point. Conversely with the withdrawal of material faster than the feed, the top level dips convexly towards a point above the point of withdrawal. If the feed is supplied towards one side of the container, or if the point of withdrawal is near one side of the container, the wood chips will pile up towards the opposite side wall. This presents the problem of preventing overflow from the container at the side where the material piles up.

With the central probe and the container walls forming the electrodes of the capacitance sensing unit by which the level is controlled, I have found there is little tendency either towards local piling up or dip in level above the outlet. Overflow of chips due to their piling up at one side is practically obviated. Accordingly, despite the highly variable dielectric constant of wood chips and the wide spacing of the electrodes of the condenser, which tends to decrease the sensitivity of the condenser to changes in level of the wood chips, I have discovered this combination of a single centrally disposed probe electrode and the wall of the chip bin, forms a particularly effective condenser for use in controlling variations in level of the wood chips in the container within extremely narrow limits, e.g. of only an inch or so.

While my invention will be particularly described in a specific preferred form in which it is used to control the level of wood chips in a wood chip bin feeding to a continuously operating digester and supplied from a wood chip storage silo, it is to be understood that invention has wider application to controlling the level of wood chips in any container to which they are supplied and from which they are continuously or intermittently withdrawn at a controlled rate, and the rate of supplying the chips to the container is to be varied as required to maintain a substantially constant level in the container.

Figure 3:
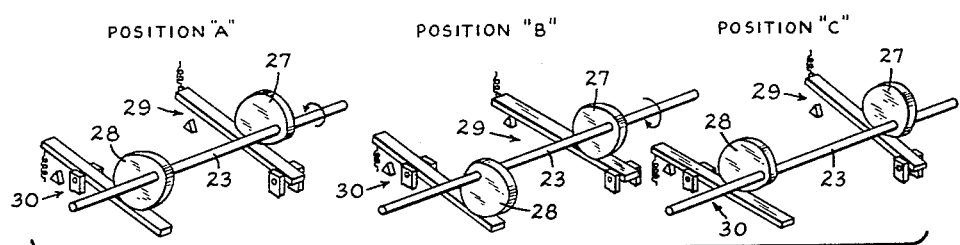

In the accompanying drawings, Figs. 1 and 2 show a preferred embodiment of my invention by which wood chips are continuously fed from a storage silo or supply container to a wood chip bin or feed container, from which they are continuously withdrawn and introduced into a continuously operating digester. A central probe electrode and the wall of the wood chip feed bin serve as the electrodes and the wood chips in the feed bin as the dielectric of a capacitor which, by the associated units shown in the drawings, serves to control the chip level in the feed bin. Fig. 3 schematically illustrates the operation of the two cam operated electrical switches of Fig. 2.

With reference to Fig. 1 of the drawings, a wood chip storage silo 1 is provided at its bottom with a rotary plate feeder 2 driven by a constant speed drive motor 3 through a variable ratio gear reducer 4. An elevator 5 carries the wood chips from the plate feeder to a chute 6 which discharges the wood chips into the top of wood chip feed bin 7 approximately at its center. From the bottom of the feed the wood chips pass into a hopper 8 from which they are drawn into a wood digester 9.

A probe electrode 10 extends centrally from the top to near the bottom of feed bin 7. The metal side wall 11 of the feed bin is electrically grounded as shown at 12 and forms the second electrode of a feed bin capacitor in which the wood chips are the dielectric between the two electrodes. Probe electrode 10 consists of a rod of conductive metal. It is covered with an non-conductive material whose electrical properties are not affected substantially by moisture. In the apparatus of this specific example a plastic covered stainless steel rod, ⅜″ in diameter, was used. The electrode is suitably insulated wherever it would contact its supports or parts of the feed bin.

A shielded coaxial lead 13 connects the probe electrode with a unit 14, which is a radio frequency capacitance sensing bridge of the Wein type. Voltage pick-up coils in each arm of the bridge are coupled to the primary of a radio frequency oscillator coil. One arm of this bridge contains the feed bin capacitor described above. A second arm of this bridge contains a variable capacitor which is adjusted to equal the capacitance of the chip feed bin capacitor and its lead to unit 14 when the wood chips are at the lowest permissible level in the bin. With this adjustment no current flows across the bridge. When the level of wood chips is higher, a potential difference exists across the bridge and current will flow in a circuit connected to the output leads of the bridge. A rectifier and an adjustable resistance are in series in the output lead which is connected to the bridge between the two capacitors. The rectifier converts current flowing across the bridge into direct current. The resistance is adjusted to limit the maximum current flow across the bridge to 1 milliampere when the wood chips are at their highest permissible level in the chip feed bin.

Unit 14 is a commercially available, continuous level indicator sold under the trade name "Telstor."

The output leads of unit 14 are connected by a shielded cable with a meter 15 of a current measuring and current and torque amplifying unit shown in Fig. 2. This unit contains four elements. They are: (1) a moving coil electrical meter 15, e.g. a d'Arsonval type meter; (2) a high frequency oscillator capacitance sensing bridge 16; (3) an electronic amplifier 17; and (4) a servomotor 18. A potential difference across the output leads from unit 14 causes a current to flow through the coil of meter 13. The coil together with a shaft 19 on which it is mounted, swings through an arc starting from the zero point when no current is flowing, to a maximum swing caused by the maximum 1 milliampere current output of unit 14. Shaft 19 carries with it a meter vane 20 in place of the indicating pointer normally carried on this shaft of a meter. A follower vane 21 is mounted on an independent shaft 22 coaxially with the meter vane so the two vanes are opposite and parallel to one another.

The two meter vanes and intervening air as dielectric are a variable capacitor which forms one arm of capacitance sensing bridge 16. The output of bridge 16 is the input to amplifier 17 which supplies the necessary current to operate servo-motor 18.

The shaft 23 of servo-motor 18 carries a pulley 24, which through belt 25 and pulley 26 on the shaft of follower vane 21, turns this vane in synchrony with rotation of the shaft of the servo-motor. With no current flowing through meter 15, meter vane 20 will be at its zero position, corresponding to the wood chips in the chip feed bin being at their lowest desired level. With 1 milliampere current flowing through the meter, the meter vane will move to its full swing position.

This current measuring and current torque amplifying unit is a conventional electrical control unit sold under the trade name "Tektolog." It is connected with and operates in conjunction with unit 14 in the usual manner. Thus for any change in level of the wood chips in the feed bin within the permissible high and low levels, causing a corresponding change in the amperage of the current output of unit 14 within the limits of 1 to 0 milliamperes, each of vanes 20 and 21 will move in a corresponding direction and amount along its arc of movement and bridge 16 will be rebalanced at a new position corresponding to the position of the chip level in the feed bin. For example, starting with the chip level at a desired maximum and meter vane 20 at the corresponding point in its arc of movement, if the chip level falls to the mid-point between this maximum and a desired minimum level, the meter vane will move to the corresponding point of its arc of swing. During this movement of the meter vane, bridge 16 is unbalanced. The resulting output of the bridge and amplifier 17 actuates servomotor 18 causing it to impart a movement to follower vane 21 corresponding in direction and degree to the movement of the meter vane. This rebalances the bridge and interrupts the flow of current from the bridge to the servo-motor when the chip level reaches and remains at this new position and the meter vane comes to rest. The shaft of the servo-motor and the follower vane are also now at their new positions, corresponding to the position of the wood chip level.

In the apparatus of this example, I have modified the "Tektolog" recorder-controller to mount on shaft 23 in addition to pulley 24, two cams 27 and 28. Below the cams I mount two single pole, single throw switches, a normally open switch 29 and a normally closed switch 30, in positions where each switch is opened and closed by rotations of one of the cams. Fig. 3 schematically illustrates these cams and switches and their operation as shaft 23 of the servo-motor on which they are mounted is rotated.

At the point in the rotation of the servo-motor shaft, when bridge 16 is balanced with the level of wood chips in feed bin 7 at the mid-point between the desired maximum and minimum levels, which may be set at will by adjustment of the angular relationship of the cams, cams 27 and 28 are in positions A of Fig. 3. Cam 27 permits switch 29 to open, and cam 28 opens switch 30. While shaft 23 and the cams are rotating in the direction indicated by the arrow, from position A to position B, cam 28 still holds switch 30 open, but cam 27 has closed switch 29. This rotation of the shaft and cams occurs as the level of wood chips in the feed bin falls towards the minimum desired level, causing the capacitance of the feed bin capacitor to decrease. This unbalances bridge 16.

When shaft 23 and cams 27 and 28 have been rotated in the direction shown by the arrow in the diagram for position B, to position C, cam 27 has let switch 29 open, and cam 28 has let switch 30 close. This rotation of the shaft and cams occurs when the level of wood chips in feed bin 7 rises towards the maximum desired level, causing an increase in the capacitance of the feed bin capacitor. This unbalances bridge 16 until the wood chip level ceases to rise and the bridge is rebalanced by the servomotor.

Switches 29 and 30 control the line current to reversing motor 31 which actuates the variable ratio gear reducer 4 to change the rate of operation of rotary plate feeder 2. An increase in rate of withdrawing chips from the feed bin causes the switches and cams to go from position A to position B as described above and the closing of switch 29. This causes the reversing motor to drive the gear reducer in the direction which increases the rate at which wood chips are supplied to feed bin 7. The wood chip level in the bin is thus returned to its midpoint and switches 29 and 30 to position A. This rate of supply of the wood chips more than compensates for the changed rate of withdrawal from the feed bin. Accordingly, the bridge continues to be unbalanced and shaft and cams continue to rotate to position C. During rotation of the cams past position A, switch 29 is allowed to open and switch 30 is allowed to close by their respective cams. The closing of switch 30 actuates reversing motor 31 to drive the gear reducer in the direction which decreases the rate of supplying wood chips to the feed bin until the level again starts to fall and is returned to and past the mid-point, and the switches and cams return to position A and then move to position B, in repeating the described cycle of switch and cam movements.

The aforedescribed operation of motor 31, alternately raising and lowering the chip level within desired limits, is modified by inserting in the line current lead to switches 29 and 30 a conventional adjustable timed switch control 32. By suitable adjustments in the timing of the open and closed positions of this switch the periods of operation of motor 31 as controlled by switches 29 and 30 are adjusted to progressively limit the excessive changes in rate of operation of the plate feeder made by motor 31 through gear reducer 4 and to bring the system into balance at substantially the desired chip level and with switches 29 and 30 and their cams at rest in position A until another change in the relative rates of supplying the wood chips to and withdrawing them from the chip feed bin initiates another change in level of the chips and another rebalancing of the system by the level control operating in the manner described.

While I have described a specific radio frequency capacitance sensing bridge unit for sensing variations in capacitance of the feed bin capacitor and a specific servocapacitance bridge-amplifier unit for measuring the output current of the capacitance sensing bridge, converting it into torque and amplifying both the current and torque, other similarly operating electrical units serving these same ends may be employed in constructing my invention. Variations in and substitutions for specific mechanical or electrical means serving various purposes in the apparatus of my invention are familiar to mechanical and electrical engineers and may be substituted for the corresponding parts of the apparatus specifically described above without departing from the scope of my invention.

While a rod is preferably employed as the central probe electrode and the wall of the feed bin itself as the second electrode, it is within the scope of my invention to substitute two parallel, spaced metal strips or plates extending downwards into the body of wood chips as the electrodes, with intervening wood chips as dielectric, in constructing the chip bin capacitor. Suitable electrodes and their positioning with the wood chips as dielectric will be obvious equivalents for those particularly described.

I claim:

1. In combination with a feed container to which wood chips are supplied from a supply container and from which they are withdrawn at controlled rates, a level control for the wood chips in said feed container which comprises two electrodes, a first electrode extending within a body of wood chips in the feed container from a point below a desired minimum level to a point above a desired maximum level for the wood chips therein, and a second electrode in contact with the wood chips in said feed container extending from a point below said minimum level to a point above said maximum level and forming with said first electrode and the wood chips as a dielectric, a capacitor the capacitance of which changes in response to changes in the chip level in the feed container throughout the range from below said minimum level to above said maximum level and means responsive to those changes in capacitance for varying the rate of transfer of wood chips from the supply container to the feed container as the level of the wood chips in the feed container changes in said range from below said minimum level to above said maximum level and maintaining the chip level in the feed container within said desired minimum and maximum levels as changes occur in the rate at which wood chips are withdrawn from said feed container.

2. The apparatus of claim 1 in which the first electrode is an electrically insulated metal rod and the second electrode is a grounded metal wall of the feed container in contact with the body of wood chips.

3. In combination a wood chip container, means for supplying wood chips at a variable rate to said container, means for withdrawing wood chips from said container at controlled rates, a level control for the wood chips in said container which comprises two electrodes, a first electrode extending within a body of wood chips in the container from a point below a desired minimum level to a point above a desired maximum level for the wood chips therein, a second electrode in contact with the wood chips in said feed container extending from a point below said minimum level to a point above said maximum level and forming with said first electrode and the wood chips as a dielectric, a capacitor the capacitance of which changes in response to changes in the chip level in the feed container throughout the range from below said minimum level to above said maximum level and means responsive to those changes in capacitance for varying the rate at which the first mentioned means supplies the wood chips to said feed container as the level of the wood chips in the feed container changes in said range from below said minimum level to above said maximum level, whereby the chip level in the feed container is maintained within said desired minimum and maximum levels as changes occur in the rate at which wood chips are withdrawn from said feed container.

4. In combination a wood chip container, electrically driven means for supplying wood chips thereto at variable rates in response to changes in the electric current supplied to said means, a level control for the wood chips in said container which comprises two electrodes, the first electrode extending within a body of wood chips in the feed bin from a point below a desired minimum level to a point above a desired maximum level for the wood chips therein, a second electrode in contact with the wood chips in said feed container extending from a point below said minimum level to a point above said maximum level and forming with said first electrode and the wood chips as a dielectric, a capacitor the capacitance of which changes in response to the changes in the chip level in the feed container throughout the range from below said minimum level to above said maximum level, a radio frequency capacitance sensing bridge containing in one arm the capacitor formed by said electrodes and wood chips and responsive to variations in capacitance of that capacitor, and having a direct current output, the amperage of which varies with variations in the level of the wood chips in the bin, a moving coil current measuring and current and torque amplifier unit responsive to the output of said capacitance measuring bridge, which unit comprises a moving coil responsive to changes in said output, a variable condenser responsive to movements of said coil, a high frequency capacitance sensing bridge one arm of which contains said last-mentioned condenser, and means for rebalancing said bridge as changes occur in said variable condenser, which last named means includes a servo-motor driven by the amplified output current of said capacitance sensing bridge when unbalanced and amplifying the torque of the moving coil, and electrical switch controls responsive to said amplified torque, to which switch controls the aforesaid electrically driven means for supplying wood chips to said wood chip container is responsive to maintain the chip level in said feed bin within the desired minimum and maximum levels.

5. In combination with a wood chip storage silo and a wood chip feed bin to which wood chips are supplied from the storage silo and from which they are withdrawn at controlled rates and pass to a treating vessel, a rotating plate feeder driven through an electrically controlled variable rate driving means regulating the rate of withdrawal of the wood chips from said silo and their introduction into the wood chip feed bin, a level control for the wood chips in said feed bin which comprises two electrodes, the first electrode extending within a body of wood chips in the feed bin from a point below a desired minimum level to a point above a desired maximum level for the wood chips therein, a second electrode forming with said first electrode and the wood chips as a dielectric, a capacitor the capacitance of which changes in response to the changes in the chip level in the feed bin throughout the range from below said minimum level to above said maximum level, a radio frequency capacitance sensing bridge containing in one arm the capacitor formed by said electrodes and wood chips and responsive to variations in capacitance of that capacitor and having a direct current output, the amperage of which varies with variations in the level of the wood chips in the bin, a moving coil current measuring and current and torque amplifier unit responsive to the output of said capacitance measuring bridge, which unit comprises a moving coil responsive to changes in said output, a variable condenser responsive to movements of said coil, a high frequency capacitance sensing bridge one arm of which contains said last mentioned condenser, and means for rebalancing said bridge as changes occur in said variable condenser, which last named means includes a servo-motor driven by the amplified output current of said capacitance sensing bridge when unbalanced and amplifying the torque of the moving coil, and electrical switch controls responsive to said amplified torque, to which switch controls the aforesaid electrically controlled variable rate driving means is responsive to maintain the chip level in said feed bin within desired minimum and maximum limits.

6. In combination with a wood chip container, means for supplying wood chips thereto which includes an electrically operated reversing motor by which the rate of supplying the wood chips to said container may be varied as wood chips are withdrawn from said container at controlled rates, a level control for the wood chips in said container which comprises two electrodes, a first electrode extending within a body of wood chips in the container from a point below a desired minimum level to a point above a desired maximum level for the wood chips therein, a second electrode in contact with the wood chips in said feed container extending from a point below said minimum level to a point above said maximum level and forming with said first electrode and the wood chips as a dielectric a capacitor the capacitance of which changes in response to changes in the chip level of the wood container throughout the range from below said minimum level to above said maximum level, a radio frequency capacitance sensing bridge containing in one arm the electrodes associated with the wood chip container a moving coil current measuring and current and torque amplifying unit responsive to the output of said capacitance sensing bridge, said unit comprising a servo-motor actuated by the amplified current output of said unit, the shaft of said servo-motor rotating in direction and degree in response to and correlated with the direction and degree of change in the level of the wood chips in said container, means associated with the shaft of said servo-motor and with two electrical switches operative to open and close one of the line current leads to said reversing motor, whereby the closing of one switch and the opening of the other switch initiates rotation of the shaft of said reversing motor in a direction opposite to the rotation of that shaft initiated by closing of the other switch, whereby a change in the rate of withdrawing wood chips from said container is compensated for by said reversing motor as controlled by said switches and the chip level in said container is maintained between desired minimum and maximum limits.

7. In combination with a wood chip container, means for supplying wood chips thereto which includes an electrically operated reversing motor by which the rate of supplying the wood chips to said container may be varied as wood chips are withdrawn from said container at controlled rates, a level control for the wood chips in said container which comprises two electrodes, a first electrode extending within a body of wood chips in the container from a point below a desired minimum level to a point above a desired maximum level for the wood chips therein, a second electrode in contact with the wood chips in said feed container extending from a point from below said minimum level to a point above said maximum level and forming with said first electrode and the wood chips as a dielectric a capacitor the capacitance of which changes in response to changes in the chip level of the wood container throughout the range from below said minimum level to above said maximum level, a radio frequency capacitance sensing bridge containing in one arm the electrodes associated with the wood chip container, a moving coil current measuring and current and torque amplifying unit responsive to the output of said capacitance sensing bridge, said unit comprising a servo-motor actuated by the amplified current output of said unit, the shaft of said servo-motor rotating in direction and degree in response to and correlated with the direction and degree of change in the level of the wood chips in said container, two cams fixed to the shaft of said servo-motor, two electrical switches each actuated by one of said cams and operative to open and close one of the line current leads to said reversing motor, whereby the closing of one switch by its cam and the opening of the other switch by its cam initiates rotation of the shaft of said reversing motor in a direction opposite to the rotation of that shaft initiated by closing of the other switch, and an adjustable timed switch control in a lead of the line current to said reversing motor operable to limit the periods of time of operation of said reversing motor initiated by said switches, whereby a change in the rate of withdrawing wood chips from said container is compensated for by said reversing motor as controlled by said switches and timed switch control, and the chip level in said container is maintained between desired minimum and maximum limits.

References Cited in the file of this patent

UNITED STATES PATENTS

| | | |
|---|---|---|
| 2,477,511 | Comb | July 26, 1949 |
| 2,618,395 | DeBrabander | Nov. 18, 1952 |
| 2,642,206 | Reed | June 16, 1953 |